Jan. 10, 1956 H. KARSH 2,730,563

SYSTEM FOR MULTIPLEXING FACSIMILE

Filed Dec. 21, 1951 4 Sheets-Sheet 1

INVENTOR
HERBERT KARSH

BY D. C. Snyder

ATTORNEY

Jan. 10, 1956 H. KARSH 2,730,563

SYSTEM FOR MULTIPLEXING FACSIMILE

Filed Dec. 21, 1951 4 Sheets-Sheet 2

INVENTOR
HERBERT KARSH

BY

D. G. Snyder

ATTORNEY

Jan. 10, 1956 H. KARSH 2,730,563

SYSTEM FOR MULTIPLEXING FACSIMILE

Filed Dec. 21, 1951 4 Sheets-Sheet 3

INVENTOR
HERBERT KARSH

BY D. C. Snyder

ATTORNEY

Jan. 10, 1956 H. KARSH 2,730,563

SYSTEM FOR MULTIPLEXING FACSIMILE

Filed Dec. 21, 1951 4 Sheets-Sheet 4

INVENTOR
HERBERT KARSH

BY

D.B. Snyder
ATTORNEY 2,730,563

SYSTEM FOR MULTIPLEXING FACSIMILE

Herbert Karsh, Falls Church, Va., assignor, by mesne assignments, to the United States of America as represented by the Secretary of the Navy Application December 21, 1951, Serial No. 262,813

12 Claims. (Cl. 178—5)

The invention described herein may be manufactured and used by or for the Government of the United States of America for governmental purposes without the payment of any royalties thereon or therefor.

The invention relates to electric signaling systems and more particularly to multiplex transmission.

In prior art multiplex transmission of "on-off" or "mark-space" signals such as shown in Valensi Patent 2,313,209, instantaneous amplitudes of the signal wave forms transmitted over the respective input channels are converted to predetermined levels and combined into a single resultant signal for transmission over a line or other transmission medium. At the distant station a suitable analyzing device responds to the resultant signal and derives from it the original instantaneous amplitudes of the several signal wave forms which are then impressed on the respective output channels.

According to the present invention an improved arrangement of signal combining and analyzing apparatus is employed. In this apparatus the individual signals are quantized to a set of values such that the sum of any arbitrary selection of signals is unique. The individual signals at the transmitting station are caused to modulate individual carriers which may be supplied by a common source. The modulated carriers are passed through individual threshold and peak limiters and amplifiers so that each signal exists as only one of two possible values. All signals are then phase corrected and combined in phase. The value of the instantaneous resultant signal is unique for each arbitrary selection of individual signals. The resultant signal is fed to a transmission line, radio link, or other transmission means. At the receiving station the resultant signal is fed to a plural channel analyzing device comprising a plurality of limiters, amplifiers and differentiating circuits. Each channel circuit is designed to pass signals of predetermined amplitudes. Since the signals passed by each channel are determined by the unique value of the instantaneous amplitude of the resultant signal, desired individual signals, are readily isolated in the appropriate channel.

In a preferred embodiment of the invention the present system is applied to facsimile transmission. Two or more black and white facsimile messages may be simultaneously transmitted over the same wire, radio link or other transmission means. This is accomplished without increase in band width requirements over that of a single channel system. Phase delay and other transmission characteristics are identical with those required for a single channel system. By use of a suitable combining apparatus other types of "on-off" or "mark-space" signals such as telegraph, teletype, etc., can be substituted for one or more of the facsimile signals. Where existing teletype, telegraph, or other "on-off" signal facilities do not provide for facsimile circuits the multiplexing system of the present invention may serve to add facsimile service to the existing signal facilities.

In view of the above considerations, it is an object of the present invention to provide an apparatus which enables multiplex operation of a plurality of signal transmission channels.

It is a further object of the present invention to provide a multiplex transmission system in which the respective transmissions are differentiated according to amplitude.

It is a further object of the present invention to provide an apparatus for multiplex signal transmission in which one or more of the multiplexed channels convey facsimile signals.

Other objects and advantages of this invention will be readily appreciated as the same become better understood by reference to the following detailed description when considered in connection with the accompanying sheets of drawings wherein.

Figures 1, 2, 3:
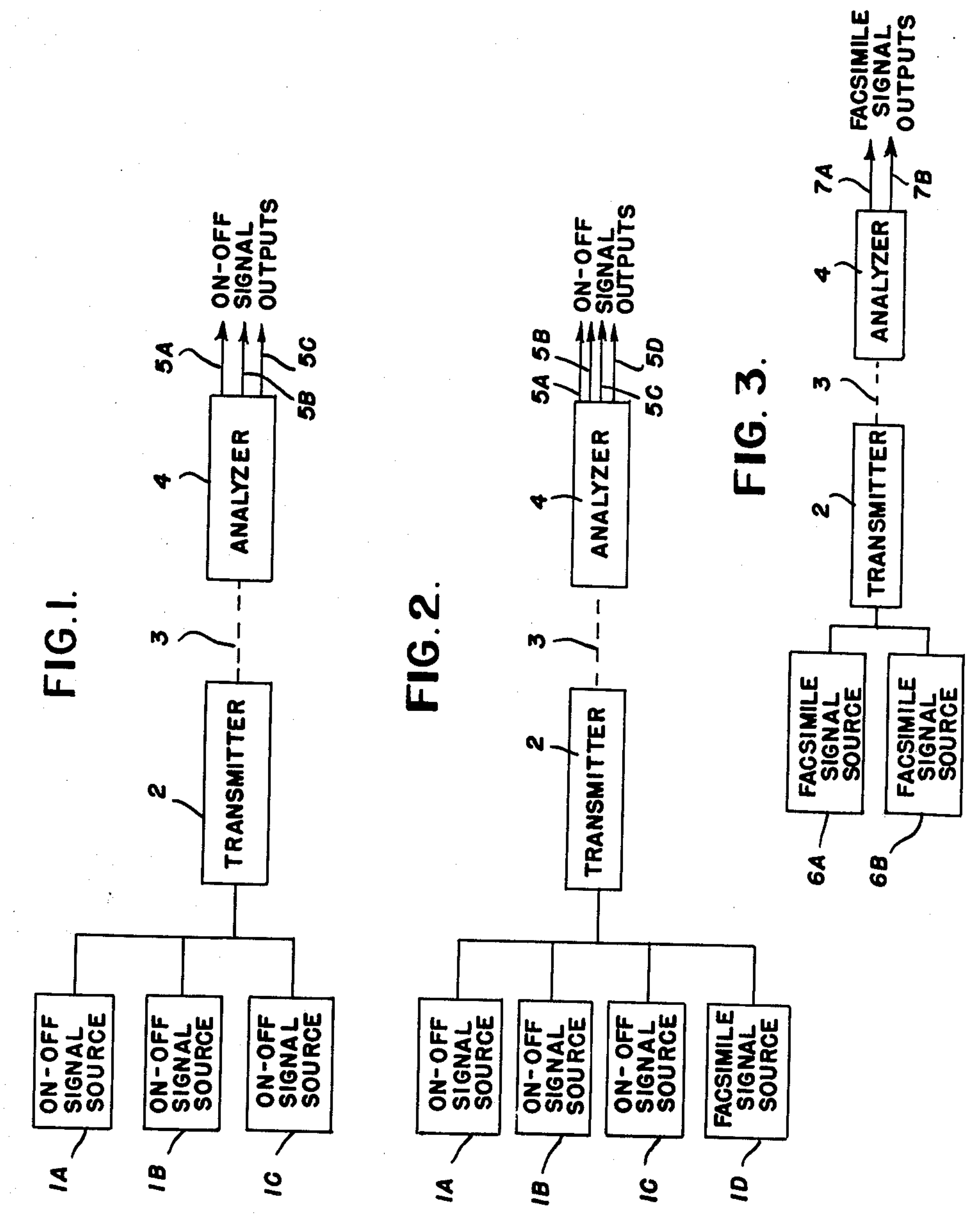
Fig. 1 represents the multiplex system of the present invention as applied to plural channel "on-off" signal transmission.
Fig. 2 represents the multiplex system as applied to plural channel "on-off" signal transmission and facsimile transmission.
Fig. 3 represents the multiplex system as applied to two-channel facsimile transmission.

Fig. 1 of the drawings shows the multiplex transmission system in which a plurality of "on-off" signal sources 1A, 1B, 1C of the same or diverse type supply signals to a multiplex transmitter 2. The transmitter combines the several signals into a resultant signal in a manner set forth in detail below and feeds the resultant signal over a transmission means 3, which may be a landline, radio link, or other transmission means, to analyzer 4 located at the receiving station. The analyzer separates the resultant signal into the original "on-off" signals in plural channels in a manner to be explained below. The analyzer output signals 5A, 5B, 5C in their respective channels are then passed to suitable receiving devices not shown to reproduce the signals originating at the signal source 1A, 1B, 1C.

In Fig. 2, one of the signal sources of a four-channel system is a facsimile scanner or other facsimile signal source 1D. The facsimile scanner is of conventional type and produces mark-space signals in a manner well known in the art. The analyzer output 5D represents a facsimile signal output which is fed to a suitable conventional facsimile receiver or reproducer not shown to reproduce the original facsimile message. If desired more than one of the signal source 1A, 1B, 1C may be replaced by facsimile scanners. The system of Fig. 2 may also be considered as an existing three channel multiplex transmission system containing signal sources 1A, 1B, 1C to which has been added a facsimile transmission channel.

In Fig. 3, a two-channel system is shown used exclusively for facsimile transmission with facsimile signal sources 6A, 6B. The original facsimile signals from signal sources 6A, 6B are obtained at outputs 7A, 7B respectively. If desired the facsimile signal sources in one or both channels may be replaced by other type "on-off" signal devices such as telegraph, teletype, etc.

Although 3, 4 and 2-channel transmission systems are illustrated in Figs. 1, 2, 3, respectively, the present invention may be applied to systems containing any other desired number of channels.

Figure 4:
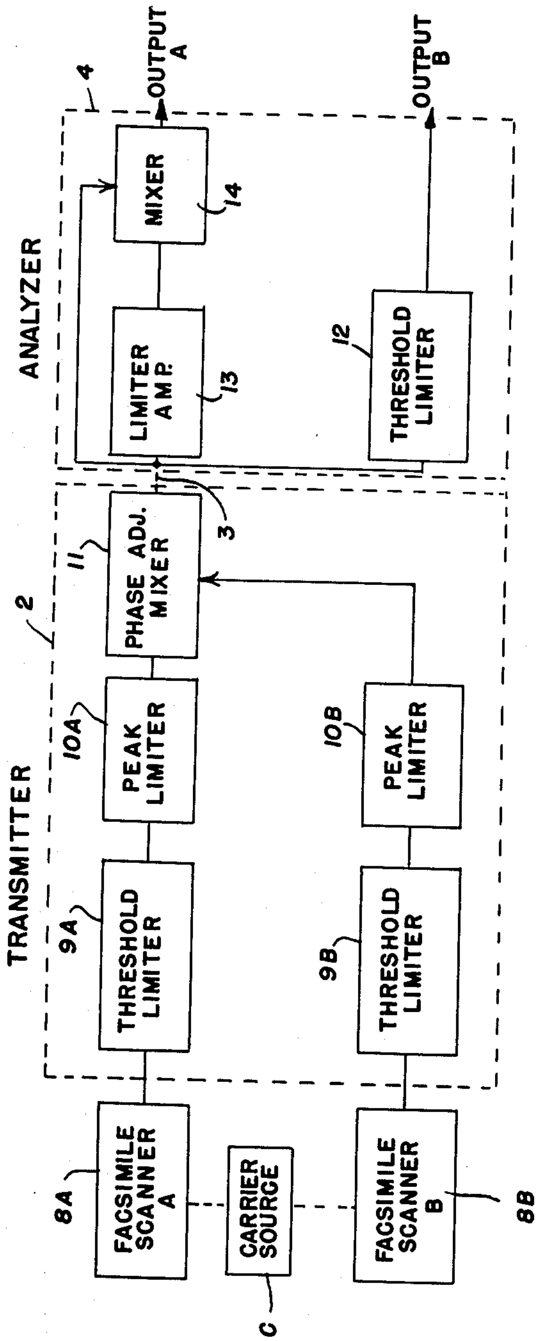
Fig. 4 represents the arrangement of principal components in a two-channel facsimile multiplex system.

Fig. 4 shows a preferred embodiment of the two-channel system of Fig. 3 including details of the arrangement of transmitter and analyzer. Each facsimile scanner 8A, 8B employs a conventional modulated carrier. The carrier may be supplied from a common source C although individual carrier sources may be used. When individual carrier sources are used the phase relationship of the several sources must be held constant. The output of each scanner is fed to a separate threshold limiter 9A, 9B and then to a peak limiter 10A, 10B. The respective limiter outputs then constitute mark-space signals having a square wave shape when black copy is scanned and zero amplitude when white copy is scanned. The circuits may be designed so that the output of limiter 10A is either E volts or zero for black and white copy respectively, while the output of limiter 10B is correspondingly $k$E volts or zero, $k$ representing a numerical constant. The outputs of the respective limiters are then corrected in phase and combined in mixer 11. The possibilities of combination are as listed in the following table, where $k$, referred to above, is assumed to equal 2.

*Table*

| Signal scanned in Channel A | Signal scanned in Channel B | Signal output voltage of A | Signal output voltage of B | Combined output voltage |
|---|---|---|---|---|
| White | White | 0 | 0 | 0 |
| White | Black | 0 | 2E | 2E |
| Black | White | 1E | 0 | 1E |
| Black | Black | 1E | 2E | 3E |

From the table it is seen that signal B is white when the combined output is below 2E voltage level. If the threshold limiter 12 at the analyzer is designed to reject signals below 2E, channel B will pass signals only when signal B is black, so that the signal B is thereby isolated in the channel B output.

The signal A is isolated in the other channel of the analyzer. From the table it is apparent that a white signal in channel A is represented by 0 or 2E combined output voltage level and a black signal in channel A is represented by a 1E or 3E combined output voltage level. Limiter-amplifier 13 is designed to have an output 2E when the combined signal input level to the analyzer is E, 2E or 3E, and 0 limiter output for 0 input. The limiter output is combined differentially in mixer 14 with the input signal to the limiter 13 so that the channel A output is 0 for 0 input, 0 for 2E input, $-1$E for E input and $+1$E for 3E input. The $\pm 1$E mixer voltage output represents a black signal and 0 mixer output represents a white signal corresponding to the signals fed to channel A at the transmitter. It must be emphasized that the values 1E, 2E for the several limiter outputs are not the only values possible. Any desired different relative values may be used for the limiter outputs.

In systems designed to handle more than two signal inputs the transmitter and analyzer are always arranged with a number of separate channels at least equal to the number of individual signal inputs. The three-channel system of Fig. 1 will have at least three transmitter-analyzer channels; the four channel system of Fig. 2 will have at least four transmitter-analyzer channels, etc. In all multiplex systems arranged in accordance with the present invention regardless of the number of channels the same method is used for combining signals in the transmitter and separating signals in the analyzer as explained above for a two-channel system.

Figure 5:
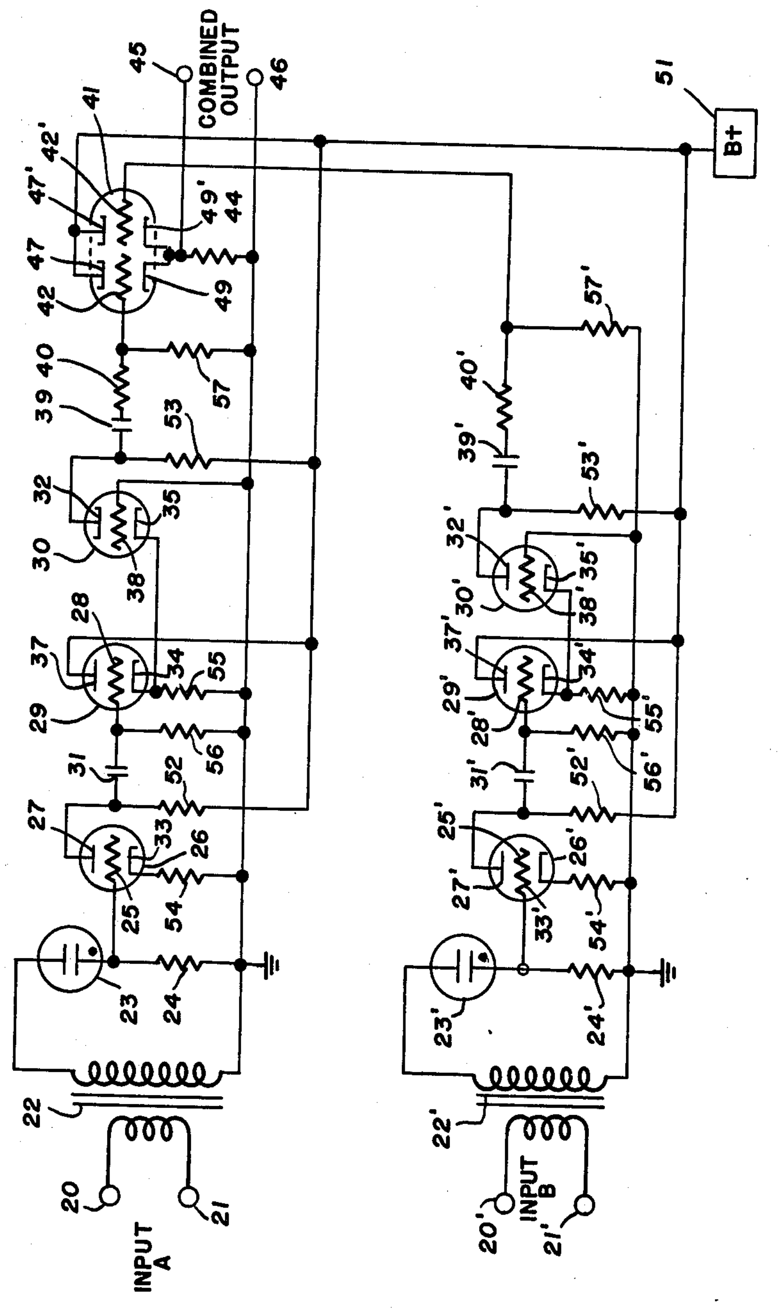
Fig. 5 shows the electrical circuitry for the transmitter of a two-channel multiplex system.

The preferred arrangement of the electrical circuitry of the transmitter and analyzer used in a two-channel multiplex system according to the present invention will now be explained. In Fig. 5 is shown a preferred arrangement of the transmitter. The two channels are designated respectively A and B to facilitate explanation. Only the circuit elements in channel A will be described since the correspondingly numbered elements in channel B have the same arrangement and functions as in channel A. Signal input A is fed to terminals 20, 21 of transformer 22. The output voltage of the transformer is applied to a gas tube 23 and resistor 24 arranged in series. The gas tube is rendered conducting only when the applied voltage exceeds a predetermined value. When the gas tube is conducting, the voltage across resistor 24 is applied to the grid 25 of amplifier tube 26. The gas tube 23 constitutes the active element of a threshold limiter which serves to reject signals having amplitudes below a predetermined value and to pass signals having greater amplitudes. The output of amplifier tube 26 is passed from plate 27 to the grid 28 of amplifier tube 29 via coupling condenser 31. Amplifier tube 29 has a cathode 34, grid 28, and plate 37. The cathode 34 is directly coupled to the cathode 35 of amplifier tube 30. Amplifier tube 30 also has a grid 38 and plate 32. Amplifier tubes 29, 30 constitute the active elements of a peak limiter which operates to control the amplitude of mark-space signals applied thereto so that the instantaneous output signal always exists as only one of two possible values. The outputs of limiter amplifier tube 30 is taken from plate 32 and passed through an RC network comprising condenser 39 and resistor 40. The several peak limiter voltage outputs which always have different predetermined amplitudes depending on the values of resistors 40, 57, 40' 57' are combined in phase in a mixer tube 41 shown for illustration as a dual triode. Of course separate multi-element tubes may be used instead of a single tube, provided plates 47, 47' and cathodes 49, 49' are connected together as shown. The outputs of the several peak limiters are applied to the grids 42, 42' which together control the current through tube 41. The combined signal appears in the output of tube 41 as the voltage across cathode resistor 44 from which the signal is applied to the terminals 45, 46 to be sent over a line or other transmission means to the analyzer at the receiving station.

The power requirements for operating the various tubes in the transmitter are supplied by any conventional D.-C. source 51 and is preferably regulated to insure stability of operation of the apparatus. The plates of all tubes are connected to the common D.-C. source 51 through appropriate plate resistors such as resistors 52, 53. Resistor 54 is cathode resistor for tube 26. Tubes 29, 30 which act as peak limiters employ the same cathode resistor 55. Resistors 24, 56, 57—57' act as grid bias resistor for tubes 26, 29 and 41 respectively. Amplifier tubes 26, 29, 30, 41 have indirectly heated cathodes 33, 34, 35, 49—49', respectively, which act as electron emitters. It should be noted that the arrangement and function of the input transformer, threshold limiter, amplifier peak limiter, phase shifter, and mixer triode networks in the respective channels is the same. The circuit elements having primed numbers perform the same functions in channel B as the correspondingly numbered elements in channel A.

Figure 6:
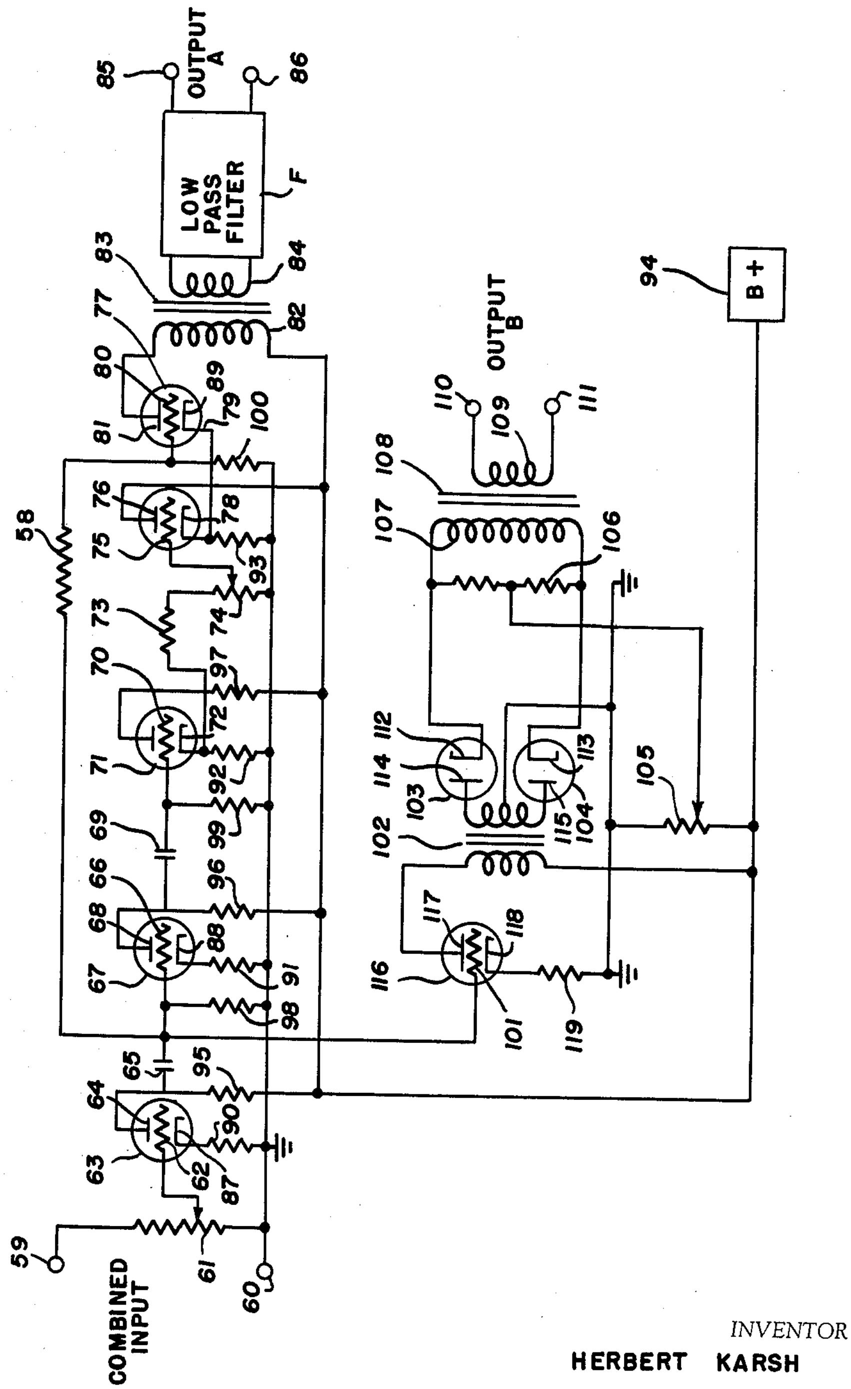
Fig. 6 shows the electrical circuitry for the analyzer of a two-channel multiplex system.

Fig. 6 shows a preferred arrangement for the analyzer in accordance with the present invention. The incoming combined signal from the transmitter is applied to terminals 59, 60 of a variable resistor 61. A suitable voltage is taken off resistor 61 and applied to the grid 62 of amplifier tube 63. Amplifier tube 63 is provided to raise the level of the combined input signal to a predetermined amplitude before passing it to various channels where the original individual signals are reestablished. The output of amplifier tube 63 is taken off plate 64 and is coupled via condenser 65 to grid 66 of amplifier tube 67. Amplifier tube 67 is the first stage of the limiter in channel A and is biased to amplify only those signals whose amplitude exceeds a predetermined value. The output of amplifier tube 67 is taken off plate 68 and applied via coupling condenser 69 to grid 70 of a second limiter amplifier tube 71. The output of amplifier tube 71 is taken off cathode 72 and applied via fixed resistor 73 and variable resistor 74 to the grid 75 of the final limiter amplifier tube 76. The parameters of the limiter amplifier tubes and the bias values are so selected and adjusted that the output of amplifier 76 is a constant predetermined value. The amplitude of the combined signal input to amplifier tube 63 is normally raised to such a high value by amplifier tubes 63, 67 and 71, that tube 76 is driven at the saturation point of the plate current to produce a constant limiter output for all values of combined signal input above a predetermined limiter input amplitude. The output of limiter tube 76 is applied to mixer tube 77 by the common connection of cathodes 78, 79. The combined amplified input signal as derived from amplifier tube 63 is also fed to grid 80 of mixer tube 77 via resistor 58 and condenser 65. By the arrangement thus shown and described the combined input signal and limiter output signal are combined differentially. The output of mixer tube 77 which is taken off plate 81 appears in primary coil 82 of transformer 83 as the desired individual channel A signal. A low pass filter F of conventional design is used to suppress undesirable harmonics of the desired signal which is taken off secondary coil 84. The output of filter F is applied to the channel A output terminals 85, 86, whence the signal is passed to a receiver, reproducer, transmission line or other utilization circuit. Cathodes 72, 78, 87, 88, 89 are indirectly heated in any conventional manner, not shown. Resistors 90, 91, 92, 93, are cathode resistors for the several amplifier tubes. Plate voltage from a D.-C. source 94 which is preferably regulated to insure stability is applied to the plates of the several tubes via plate resistors 95, 96, 97. Resistors 98, 99, 100 are grid bias resistors for tubes 67, 71, 77, respectively.

Channel B of the analyzer circuit shown in Fig. 6 commences with an amplifier tube 116 having grid 101, plate 117 and cathode 118. Resistor 119 is a cathode resistor for tube 116. The combined input signal is applied to grid 101 from the plate 64 of amplifier tube 63 via condenser 65. After suitable amplification by tube 116 the combined signal is applied from plate 117 to a threshold limiter via transformer 102. The threshold limiter comprises two diodes 103, 104 having cathodes 112, 113 and plates 114, 115, respectively. The diodes are rendered conducting when only the signal input exceeds a predetermined value. The threshold limiter isolates channel B signals since signals less than a predetermined value represent space or white signals and are rejected by the limiter while signals of greater amplitude are mark or black signals and are passed by the limiter. When the gas tubes fire they pass current the magnitude of which is substantially constant and primarily determined by the D.-C. voltage supplied from D.-C. source 94 via the variable voltage controlling resistor 105. Resistor 106 is a divided plate load resistor for the diodes 103, 104 and is balanced to ground. When the diodes are rendered conducting and when they cease conducting, voltages are induced in the primary 107 of transformer 108. Corresponding pulses are induced in secondary 109 and signify the beginning and end of the desired mark or black or signals. The output of channel B is taken off terminals 110, 111 and passed to a suitable utilization device.

It should be noted that the triode tubes shown and described in the analyzer of Fig. 6 as well as the transmitter circuit of Fig. 5 may be replaced by tetrode, pentode, or other multi-element tubes as is well known in the art.

Obviously many modifications and variations of the present invention are possible in the light of the above teachings. It is therefore to be understood that within the scope of the appended claims the invention may be practiced otherwise than as specifically described.

What is claimed is:

1. A system for amplitude multiplex signaling comprising means for simultaneously combining a plurality of continuous signals into a single resultant signal of varying amplitude and threshold and amplitude limiting means for analyzing said signal into separate signals in accordance with the amplitude of each of the original separate signals.

2. A system for amplitude multiplex signaling comprising means for simultaneously combining a plurality of continuous signals into a single resultant signal of varying amplitude, and means having a plurality of channels for analyzing said single resultant signal into separate signals a threshold limiter in at least one of said channels and an amplitude limiter and mixer in series connection in at least one other channel.

3. In a system for multiplex signaling, means for simultaneously combining a plurality of signals into a single resultant signal, means having a plurality of channels for analyzing said resultant signal into separate signals, a threshold limiter in at least one of said channels, an amplitude limiter in at least one other of said channels, and means for combining differentially the signal output of said amplitude limiter with said resultant signal.

4. In a system for multiplex signaling in which a plurality of signal channels are provided, means for amplifying signals in each of said channels to a different constant predetermined amplitude level, means for simultaneously combining signals in said channels into a single resultant signal, means having a plurality of channels for analyzing said signal into separate component signals, an amplitude limiter in at least one of said channels, and means for combining differentially the signal output of said amplitude limiter with said resultant signal.

5. A transmission system for a multiplex signal comprising an analyzer having a plurality of channels, a threshold limiter in at least one of said channels, an amplitude limiter in at least one other of said channels, and means for combining differentially the signal output of said amplitude limiter with said multiplexed signal.

6. A system for multiplex signaling in which a plurality of signal channels are provided, comprising a plurality of signal sources, means for amplifying signals in each channel to a different constant predetermined amplitude level, means for simultaneously combining said signals into a single resultant signal of varying amplitude, transmission means for said resultant signal, means having a plurality of analyzer channels for analyzing said resultant signal, a threshold limiter in at least one analyzer channel, a signal amplitude limiter in at least one other analyzer channel, and means for combining differentially the output of said amplitude limiter with said resultant signal in said other analyzer channel.

7. A multiplex system for facsimile transmission comprising a plurality of facsimile scanners, means for amplifying the signal outputs of each of said scanners to a different constant predetermined amplitude level, means for superposing the signal outputs of said scanners into a single resultant signal and means having amplitude type limiting means in each of a plurality of channels and threshold type limiting means in each of another plurality of channels for analyzing said resultant signal into a plurality of separate signals in accordance with the difference in amplitude levels of each of the original signal outputs.

8. A multiplex system for facsimile signal transmission comprising a plurality of facsimile scanners, means for amplifying the output signals of each of said scanners to different constant amplitude levels, means for superposing said signals into a single resultant signal having varying amplitude, transmission means for said signal, means having a plurality of channels for analyzing said signal into a plurality of separate signals in accordance with the magnitude of the amplified output signals, an amplitude limiter in at least one of said channels, and means for combining differentially the signal output of said amplitude limiter with the resultant signal.

9. A multiplex signal transmission system comprising a plurality of signal sources, a facsimile scanner constituting at least one of said signal source, means for simultaneously combining outputs of said signal sources into a single resultant signal of varying amplitude, means having a plurality of channels for analyzing said signal, a threshold limiter in at least one analyzer channel, a signal amplitude limiter in at least one other analyzer channel, and means combining differentially the output of said amplitude limiter with said signal in said other analyzer channel.

10. A system for amplitude multiplex signaling comprising means for superposing in phase a plurality of phase corrected continuous signals into a single resultant signal, means having a plurality of channels for analyzing the resultant signal into separate signals upon the basis of the difference in amplitude levels of the original signals, an amplitude limiter in at least one of said channels, a threshold limiter in at least one other of said channels, and means for combining differentially the signal output of said amplitude limiter with said resultant signal.

11. A system for amplitude multiplexing signaling comprising means for simultaneously combining in phase a plurality of continuous signals each of a different amplitude level into a single resultant signal, means having a plurality of channels for analyzing the resultant signal into separate signals in accordance with the difference in amplitude levels of the original signals, an amplitude limiter in at least one of said channels, a threshold limiter in at least one other of said channels, and mixing means in series connection with the amplitude limiter for combining differentially the signal output of said amplitude limiter with said resultant signal.

12. A multiplex system for facsimile signal transmission comprising means for superposing a plurality of facsimile signals of different constant amplitude levels into a single resultant signal of varying amplitude, means having a plurality of channels for analyzing said resultant signal into separate signals upon the basis of the difference in amplitude levels of the original signals, an amplitude limiter in at least one of said channels, and means for combining differentially the signal output of said amplitude limiter with said resultant signal.

References Cited in the file of this patent

UNITED STATES PATENTS

| | | |
|---|---|---|
| 2,143,081 | Miller | Jan. 10, 1939 |
| 2,200,344 | Rudd | May 14, 1940 |
| 2,558,489 | Kalfaian | June 26, 1951 |
| 2,579,971 | Schade | Dec. 25, 1951 |